United States Patent
Hurwitz et al.

(10) Patent No.: US 9,157,368 B2
(45) Date of Patent: Oct. 13, 2015

(54) ACTIVE FLOW CONTROL FOR NACELLE INLET

(75) Inventors: Wayne Hurwitz, West Hartford, CT (US); Stuart S. Ochs, Manchester, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 2442 days.

(21) Appl. No.: 11/850,300

(22) Filed: Sep. 5, 2007

(65) Prior Publication Data

US 2009/0060704 A1    Mar. 5, 2009

(51) Int. Cl.
*F02C 7/057* (2006.01)
*B64D 33/02* (2006.01)
*F01D 17/02* (2006.01)

(52) U.S. Cl.
CPC .............. *F02C 7/057* (2013.01); *B64D 33/02* (2013.01); *F01D 17/02* (2013.01); *B64D 2033/0226* (2013.01); *B64D 2033/0286* (2013.01); *F05D 2270/301* (2013.01); *F05D 2270/44* (2013.01); *F05D 2270/62* (2013.01)

(58) Field of Classification Search
USPC ...................... 415/1, 116, 118, 220, 221, 914
See application file for complete search history.

(56) References Cited

U.S. PATENT DOCUMENTS

| | | | |
|---|---|---|---|
| 2,587,227 A * | 2/1952 | Roy .................................. | 244/74 |
| 2,805,831 A | 9/1957 | Zborowski | |
| 4,644,806 A * | 2/1987 | Flagg et al. ................. | 73/863.58 |
| 4,827,712 A * | 5/1989 | Coplin .......................... | 60/226.1 |
| 5,018,873 A * | 5/1991 | Bobo ............................. | 374/144 |
| 5,125,597 A * | 6/1992 | Coffinberry ............... | 244/118.5 |
| 5,136,837 A * | 8/1992 | Davison .......................... | 60/785 |
| 5,143,329 A * | 9/1992 | Coffinberry .................. | 244/209 |
| 5,222,698 A * | 6/1993 | Nelson et al. ................. | 244/203 |
| 5,224,332 A * | 7/1993 | Schwarz et al. ............... | 60/779 |
| 5,297,765 A * | 3/1994 | Hughes et al. ................ | 244/209 |
| 5,447,283 A | 9/1995 | Tindell | |
| 5,743,493 A * | 4/1998 | McCaughan ................. | 244/130 |

(Continued)

FOREIGN PATENT DOCUMENTS

EP    1 627 990 A2    2/2006

(Continued)

OTHER PUBLICATIONS

PCT Application No. PCT/US06/39993, filed on Oct. 12, 2006.
PCT Application No. PCT/US06/39797, filed on Oct. 12, 2006.
U.S. Appl. No. 11/595,040, filed Nov. 10, 2006.
European Search Report for EP Application No. 08252911.6, Dec. 2, 2011.

*Primary Examiner* — Sean J Younger
(74) *Attorney, Agent, or Firm* — Carlson, Gaskey & Olds, P.C.

(57) ABSTRACT

The disclosed turbine engine includes a fan nacelle surrounding a fan and including an inlet arranged upstream from the fan. The inlet includes an inlet surface having a boundary layer flow. A flow control actuator is in fluid communication with the inlet surface. A boundary layer sensing device is associated with the inlet surface for detecting a boundary layer condition at the inlet surface. A controller is in communication with the flow control actuator and the boundary layer sensing device. The controller is programmed to command the flow control actuator in response to the boundary layer sensing device detecting an undesired boundary layer condition. In this manner, the flow control actuator generates a desired boundary layer condition.

1 Claim, 1 Drawing Sheet

(56) References Cited

U.S. PATENT DOCUMENTS

| | | | |
|---|---|---|---|
| 5,894,990 A | 4/1999 | Glezer et al. | |
| 6,179,251 B1 | 1/2001 | Tindell et al. | |
| 6,334,753 B1 | 1/2002 | Tillman et al. | |
| 6,390,418 B1 | 5/2002 | McCormick et al. | |
| 6,732,579 B2 * | 5/2004 | Keith et al. | 73/147 |
| 7,802,760 B2 * | 9/2010 | Webster | 244/207 |
| 2005/0022866 A1 | 2/2005 | Sakurai et al. | |
| 2005/0081530 A1 | 4/2005 | Bagnall et al. | |
| 2006/0022092 A1 | 2/2006 | Miller et al. | |

FOREIGN PATENT DOCUMENTS

| | | |
|---|---|---|
| GB | 2 191 606 A | 12/1987 |
| GB | 2 232 132 A | 12/1990 |
| GB | 2407142 | 4/2005 |
| WO | 00/55036 A2 | 9/2000 |
| WO | 01/06134 A1 | 1/2001 |

* cited by examiner

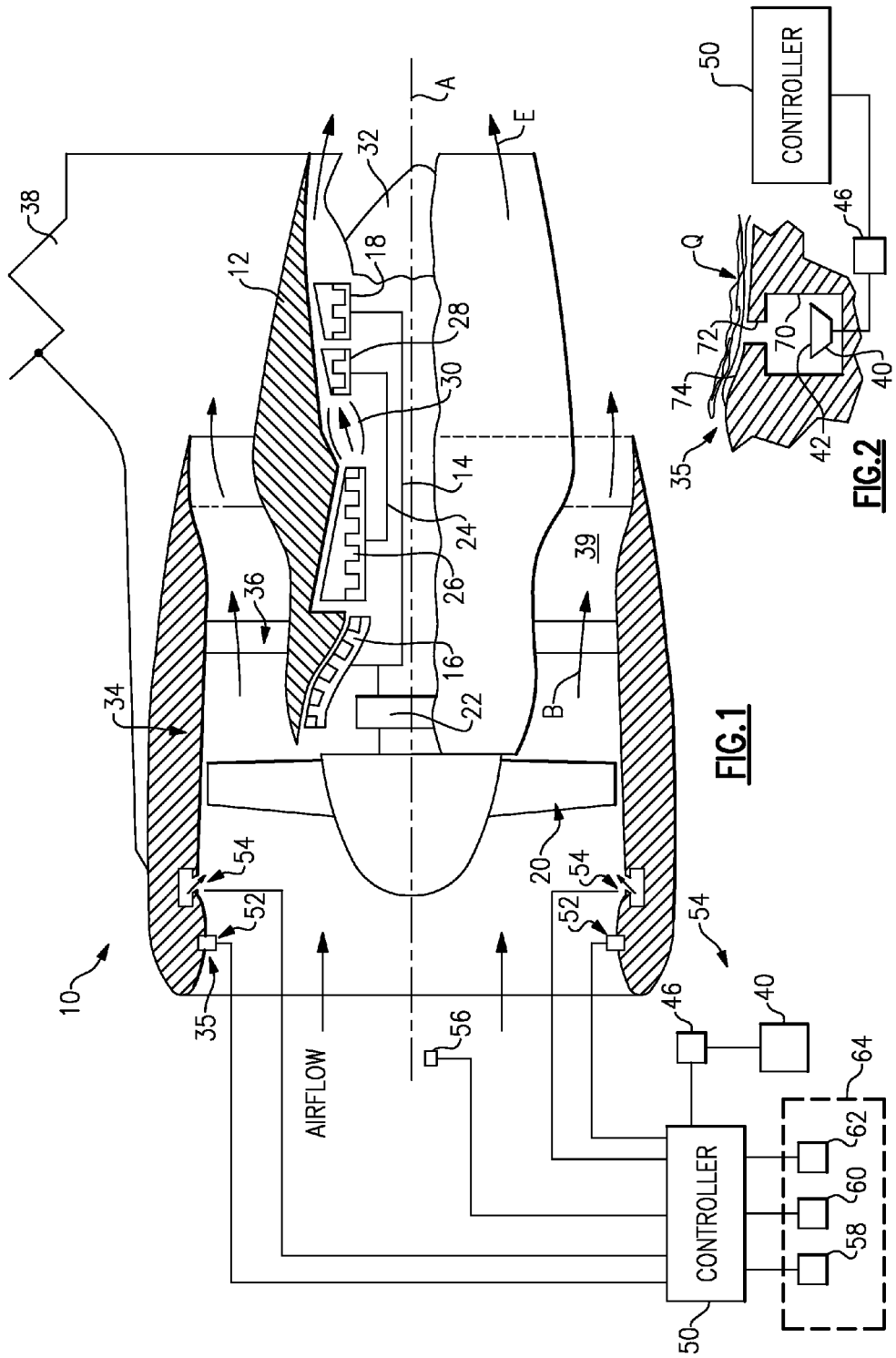

ACTIVE FLOW CONTROL FOR NACELLE INLET

BACKGROUND

This disclosure relates to an active flow control device for a nacelle inlet of a turbofan engine. In particular, the disclosure relates to controlling the boundary layer at the nacelle inlet with the active flow control device.

Engine nacelle design for large commercial geared turbofan engines is a significant contributor to overall engine performance and operability. Inlet lip thickness and diffuser length associated with the fan nacelle are typically sized to provide laminar inlet flow to the engine during take-off, low speed climb, high angle of attack operation and in extreme crosswinds. As a general rule, thicker inlet lips and longer diffuser lengths are required to maintain acceptable performance at these operating conditions and minimize the potential for boundary layer flow separation. Larger inlet nacelle geometry adds size, weight and cost to the engine, which are undesirable.

Larger inlet nacelle geometry is also required to accommodate acoustic treatments to meet low noise requirements for direct drive turbofan engines. Acoustic treatments typically are not necessary for geared turbofan engines due to the decreased noise associated with their operation as compared to direct drive turbofans. Larger inlet nacelle geometry also increases overall aircraft drag at cruise operating conditions, which results in higher overall fuel burn rates and higher aircraft operating costs.

What is needed is a smaller fan nacelle that is able to maintain desired boundary layer flow at the nacelle inlet.

SUMMARY

The disclosed turbine engine includes a fan nacelle surrounding a fan and including an inlet arranged upstream from the fan. The inlet includes an inlet surface having a boundary layer flow. A flow control actuator is in fluid communication with the inlet surface. A boundary layer sensing device is associated with the inlet surface for detecting a boundary layer condition at the inlet surface. A controller is in communication with the flow control actuator and the boundary layer sensing device. The controller is programmed to command the flow control actuator in response to the boundary layer sensing device detecting an undesired boundary layer condition. In this manner, the flow control actuator generates a desired boundary layer condition.

In one example, the flow control actuator includes a chamber in fluid communication with the inlet surface via a passage. An exciter, such as a diaphragm, is arranged in the chamber to selectively inject and withdraw fluid from the boundary layer flow to achieve the desired boundary layer condition. As a result, a smaller fan nacelle can be used for the turbofan engine even though its reduced size is more susceptible to boundary layer separation. When boundary layer separation is detected or imminent, the controller commands the flow control actuator to make adjustments to the boundary layer at the inlet surface to maintain laminar flow.

Accordingly, the disclosed turbine engine provides a smaller fan nacelle while maintaining desired boundary layer flow.

These and other features of the disclosure can be best understood from the following specification and drawings, the following of which is a brief description.

BRIEF DESCRIPTION OF THE DRAWINGS

FIG. 1 is a cross-sectional view of an example turbofan engine.

FIG. 2 is an enlarged cross-sectional view of a portion of the turbofan engine shown in FIG. 1 depicting an example flow control actuator.

DETAILED DESCRIPTION

A geared turbofan engine 10 is shown in FIG. 1. A pylon 38 secures the engine 10 to an aircraft. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a fan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the example shown, the engine 10:1 is a high bypass turbofan arrangement. In one example, the bypass ratio is greater than 10, and the turbofan diameter is substantially larger than the diameter of the low pressure compressor 16. The low pressure turbine 18 has a pressure ratio that is greater than 5:1, in one example. The gear train 22 is an epicycle gear train, for example, a star gear train, providing a gear reduction ratio of greater than 2.5:1. It should be understood, however, that the above parameters are only exemplary of a contemplated geared turbofan engine. That is, the invention is applicable to other engines including direct drive turbofans.

Airflow enters a fan nacelle 34, which surrounds the core nacelle 12 and fan 20. The fan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle 12 and a tail cone 32.

The core nacelle 12 is supported within the fan nacelle 34 by structure 36, such as flow exit guide vanes. A generally annular bypass flow path 39 is arranged between the core and fan nacelles 12, 34. The example illustrated in FIG. 1 depicts a high bypass flow arrangement in which approximately eighty percent of the airflow entering the fan nacelle 34 bypasses the core nacelle 12. The bypass flow B within the bypass flow path 39 exits the fan nacelle 34 through a fan nozzle exit area at the aft of the fan nacelle 34.

With continuing reference to FIG. 1, the fan nacelle 34 includes an inlet 35 through which airflow enters the engine 10. Boundary layer flow separation at the inlet 35 typically results in reduced engine performance and operability. Boundary layer flow separation typically increases as the inlet lip thickness is reduced, for example. However, smaller fan nacelles are desirable to decrease the weight and cost of the engine 10. To this end, the engine 10 includes a smaller fan nacelle 34 that includes one or more flow control actuators 54 to regulate the boundary layer associated with the inlet 35.

One or more boundary layers sensing devices, such as an inlet sensor 52 and/or free stream pressure sensor 56 can be used to determine whether a boundary layer separation is imminent or occurring at the inlet 35. In one example, the inlet sensor 52 is a lip static pressure sensor. In another example, the inlet sensor 52 is a boundary layer shear sensor. Other boundary layer sensing devices can be used instead of or in addition to the inlet sensor 52 and/or free stream pressure sensor 56. For example, information typically associated with an aircraft control system 64, such as aircraft speed 58, angle of attack information 60 and engine airflow 62, can be used to determine an imminent or occurring boundary layer separation at the fan nacelle inlet 35.

A controller 50 is in communication with boundary layer sensing devices and the flow control actuator 54. Unlike some boundary layer systems that utilize bleed air from the core, the flow control actuator can inject or withdraw fluid from the boundary layer Q (FIG. 2) depending upon what is necessary to maintain a desired boundary layer condition.

Referring to FIGS. 1 and 2, the flow control actuator 54 includes an exciter 40 modulated by a driver 46, for example, in response to commands from the controller 50. In one example, the exciter 40 includes a diaphragm 42. In the example shown in FIG. 2, a chamber 70 is in fluid communication with an inlet surface 74 of the inlet 35 via a passage 72. The diaphragm 42 communicates with the chamber 70 and is moved in a desired direction by the driver 46. In conditions in which fluid must be removed from the boundary layer Q in order to maintain laminar flow, the exciter 40 is actuated by the controller 50 using driver 46 to draw fluid into the chamber 70 from the boundary layer Q. In conditions in which fluid must be added to the boundary layer Q in order to maintain laminar flow, the exciter 40 is actuated by the controller 50 using driver 46 to inject fluid from the chamber 70 into the boundary layer Q. In this manner, the controller 50 commands the flow control actuator 54 to generate a desired boundary layer condition at the inlet surface 74 when an undesired boundary layer condition exists.

The flow control actuator 54 dynamically energizes the boundary layer Q by injecting or withdrawing small amounts of air in and out of the boundary layer flow. In this manner, the flow control actuators 54 are able to reattach the boundary layer Q or reduce the tendency of the boundary layer to separate and thereby improve overall inlet performance. The controller 50 subsequently turns the flow control actuators 54 off, for example, when the boundary layer sensing device detects that the conditions causing boundary layer separation no longer exist.

Although an example embodiment has been disclosed, a worker of ordinary skill in this art would recognize that certain modifications would come within the scope of the claims. For that reason, the following claims should be studied to determine their true scope and content.

What is claimed is:

1. A turbine engine comprising:
   fan nacelle surrounding a fan and including an inlet arranged upstream from the fan, the inlet including an inlet surface;
   a flow control actuator in fluid communication with the inlet surface;
   a boundary layer sensing device associated with the inlet surface for detecting a boundary layer condition at the inlet surface;
   a controller in communication with the flow control actuator and boundary layer sensing device, the controller programmed to command the flow control actuator in response to the boundary layer sensing device detecting an undesired boundary layer condition to generate a desired boundary layer condition; and
   wherein the boundary layer sensing device includes at least one of a free stream pressure sensor, a lip static pressure sensor, a boundary layer shear sensor at the inlet surface, an aircraft speed, angle of attack information and engine airflow.

* * * * *